United States Patent
Golly et al.

(10) Patent No.: US 10,780,502 B2
(45) Date of Patent: Sep. 22, 2020

(54) AIR DATA PROBE REPAIR

(71) Applicant: Rosemount Aerospace Inc., Burnsville, MN (US)

(72) Inventors: Timothy Thomas Golly, Lakeville, MN (US); Paul Robert Johnson, Prior Lake, MN (US); Greg Allen Seidel, Farmington, MN (US); Ryan Chou, Bloomington, MN (US); Rudy Pitera, Woodbury, MN (US); Scott Wigen, Eagan, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 33 days.

(21) Appl. No.: 16/159,319

(22) Filed: Oct. 12, 2018

(65) Prior Publication Data

US 2020/0114428 A1 Apr. 16, 2020

(51) Int. Cl.
| | |
|---|---|
| *B22F 7/06* | (2006.01) |
| *B22F 3/10* | (2006.01) |
| *G01P 5/16* | (2006.01) |
| *B64F 5/40* | (2017.01) |
| *B22F 3/105* | (2006.01) |
| *G01P 5/165* | (2006.01) |
| *B33Y 10/00* | (2015.01) |
| *B33Y 80/00* | (2015.01) |

(52) U.S. Cl.
CPC ............ *B22F 7/062* (2013.01); *B22F 3/1055* (2013.01); *B64F 5/40* (2017.01); *G01P 5/165* (2013.01); *B22F 2007/068* (2013.01); *B33Y 10/00* (2014.12); *B33Y 80/00* (2014.12)

(58) Field of Classification Search
CPC ................. B22F 7/06; B22F 3/10; B64F 5/40
See application file for complete search history.

(56) References Cited

U.S. PATENT DOCUMENTS

| | | | |
|---|---|---|---|
| 3,355,946 A | 12/1967 | Lazell | |
| 9,279,684 B2 | 3/2016 | Marty et al. | |
| 9,891,083 B2 | 2/2018 | Gordon et al. | |
| 10,288,584 B2* | 5/2019 | Shigetomi | G01N 29/2475 |
| 2016/0304210 A1 | 10/2016 | Wentland et al. | |
| 2018/0143049 A1* | 5/2018 | Gordon | B23K 1/0008 |

FOREIGN PATENT DOCUMENTS

GB 2521048 A 6/2015

OTHER PUBLICATIONS

Extended European Search Report dated Mar. 2, 2020, issued during the prosecution of European Patent Application No. EP 19202541.9.

* cited by examiner

*Primary Examiner* — Jewel V Dowtin
(74) *Attorney, Agent, or Firm* — Locke Lord LLP; Scott D. Wofsy; Alicia J. Carroll (57) ABSTRACT

A method of repairing an air data probe includes assessing an air data probe for a damaged portion. The method includes depositing a material on the air data probe to repair the damaged portion of the air data probe. An air data probe includes a probe body including a sense port inlet defined through a wall of the probe body. At least a portion of the wall surrounding the sense port inlet is defined by a deposited material having a different microstructure than a material defining another portion of the wall.

21 Claims, 8 Drawing Sheets

AIR DATA PROBE REPAIR

BACKGROUND

1. Technical Field

The present disclosure relates to air data probes and more particularly to air data probes for aerospace applications.

2. Description of Related Art

A variety of air data probe devices are known in the art for aircraft flight control. Of such devices, many are directed to measuring Pitot pressure, static pressure, local angle of attack pressures, and angle of sideslip pressures as parameters for calculating pressure altitude, altitude rate, airspeed, Mach number, angle of attack, and angle of sideslip. The air data probe typically includes a Pitot pressure port located at the tip of the air data probe aligned with the longitudinal axis of the probe and/or one or more static pressure ports located on the side of the probe head integral to the probe's surface which sense the atmospheric pressure outside of the aircraft. When these pressure ports take consistent pressure measurements, they can provide accurate and consistent calculations of the above mentioned parameters.

In ordinary use, exposure to the elements can eventually cause corrosion of the sensor ports and other portions of the probe device. Additionally, air data probe devices can be damaged during handling, such as during a pre-flight check. Such corrosion and deformation can alter the geometry of the sensor ports. This can reduce accuracy, and if the reduction in accuracy is substantial enough the probe must be replaced in order to resume accurate and consistent calculations parameters like those listed above.

Such conventional methods and systems have generally been considered satisfactory for their intended purpose. However, there is still a need in the art for repair methods for restoration of proper function. There also remains a need in the art for such repairs that are easy to make.

SUMMARY

A method of repairing an air data probe includes assessing an air data probe for a damaged portion. The method includes depositing a material on the air data probe to repair the damaged portion of the air data probe.

In accordance with some embodiments, the method includes scanning the air data probe with an optical inspection device to assess an amount and a location of damage. The method can include machining the damaged portion of an air data probe. The air data probe can include at least one sense port inlet. The method can include temporarily plugging the at least one sense port inlet to limit contamination from entering the air data probe during material deposition, and/or other stages of repair. Depositing the material can include depositing the material using at least one of directed energy deposition or powder bed fusion. The method can include machining the material to conform to a specified geometry. Machining the damaged portion of the air data probe can include removing corrosion from the damaged area.

In accordance with some embodiments, the material includes an alloy having at least one of a higher wear resistance or a higher corrosion resistance than an original material of the air data probe. The material can include an alloy having better thermal performance than an original material of the air data probe. The material can include the original material of the air data probe. The air data probe can be mounted to an aircraft during material deposition. The damaged portion can be a damaged sense port inlet. The damaged sense port inlet can be defined through a tip of the air data probe. The damaged sense port inlet can be a Pitot pressure port inlet, an angle of attack port, a static port, an angle of sideslip port, and/or a drain port. The method can include inserting a plug into the damaged sense port inlet. The method can include welding or otherwise securing the plug into the damaged sense port inlet. Depositing the material can include depositing material over and around the plug. The method includes machining the deposited material and/or plug to conform to a specified geometry and forming a new sense port in substantially the same position as the plug. The method includes forming a new sense port in substantially the same position as the plug.

In accordance with yet another aspect, an air data probe includes a probe body including a sense port inlet defined through a wall of the probe body. At least a portion of the wall surrounding the sense port inlet is defined by a deposited material having a different microstructure than a material defining another portion of the wall.

In accordance with some embodiments, the sense port inlet is a Pitot pressure port inlet defined on a tip of the probe body. The sense port inlet can be surrounded at least in part with a plug mounted in the wall of the probe body. The deposited material can include an alloy having at least one of a higher wear resistance or a higher corrosion resistance than the material defining another portion of the wall.

These and other features of the systems and methods of the subject invention will become more readily apparent to those skilled in the art from the following detailed description taken in conjunction with the drawings.

BRIEF DESCRIPTION OF THE DRAWINGS

So that those skilled in the art to which the subject invention appertains will readily understand how to make and use the devices and methods of the subject invention without undue experimentation, certain embodiments thereof will be described in detail herein below with reference to certain figures, wherein.

DETAILED DESCRIPTION

Figure 1A:
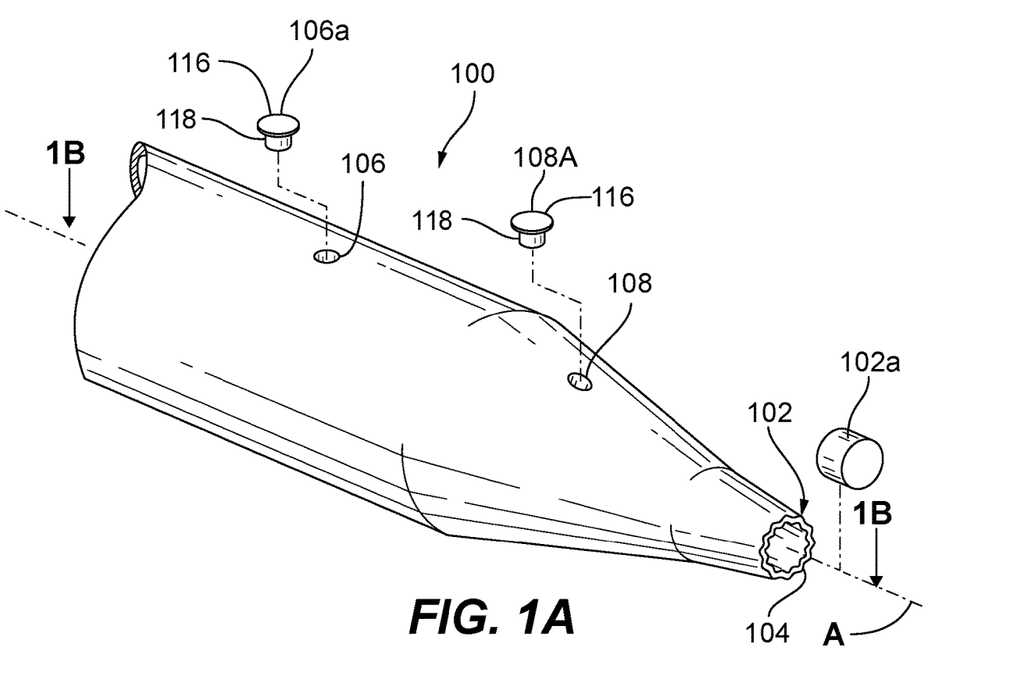
FIG. 1A is a perspective view of a portion of an exemplary embodiment of an air data probe constructed in accordance with embodiments of the present disclosure, showing a damaged area around the Pitot pressure port.

Reference will now be made to the drawings wherein like reference numerals identify similar structural features or aspects of the subject invention. For purposes of explanation and illustration, and not limitation, a partial view of an exemplary embodiment of air data probe repair in accordance with the invention is shown in FIG. 1A and is designated generally by reference character 100. Other embodiments of air data probe repair in accordance with the invention, or aspects thereof, are provided in FIGS. 1B-12, as will be described. The methods and systems of the invention can be used for repair of air data probes with corroded or otherwise damaged sense ports, to improve or restore probe functional performance.

Figure 1B:
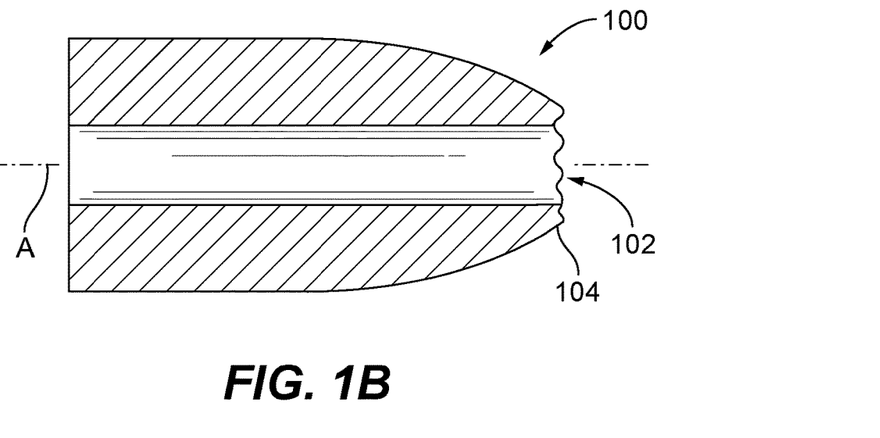
FIG. 1B a schematic side cross-sectional view of a portion of an exemplary embodiment of an air data probe constructed in accordance with embodiments of the present disclosure, showing a damaged area around the Pitot pressure port.

As shown in FIGS. 1A and 1B, an air data probe 100 includes a Pitot pressure port inlet 102 opening in a direction that is substantially parallel to the longitudinal axis A of air data probe 100. In addition to port inlet 102, probe 100 includes additional sense port inlets, shown as a static port 106 and an angle of attack port 108. There is a damaged area 104 around port inlet 102. In order to determine the extent and/or location of the damage, air data probe 100 is assessed by scanning air data probe 100 with an optical inspection device or by analyzed via metrology. Assessing air data probe 100 acts to identify a damaged portion with a reasonable degree of accuracy. In other words, some damage may exist outside of the portion identified as damaged and some non-damaged portion may exist within the portion that is identified as damaged.

With continued reference to FIG. 1A, a method for repairing air data probe 100 includes temporarily plugging sense port inlets 106 and 108 with plugs 106a and 108a to limit contamination from entering air data probe 100 during machining and/or material 112 deposition. Plugs 106a and 108a prevent and/or inhibit material 112 from the depositing process from penetrating into air data probe 100, which could have deleterious effects on probe 100 function. While each plug 106a and 108a includes an enlarged head 116 and insert portion 118, which form a t-shaped cross-section, this is exemplary only. Any other suitable cross-section can be used, for example frustoconical, without departing from the scope of this disclosure.

Figure 2A:
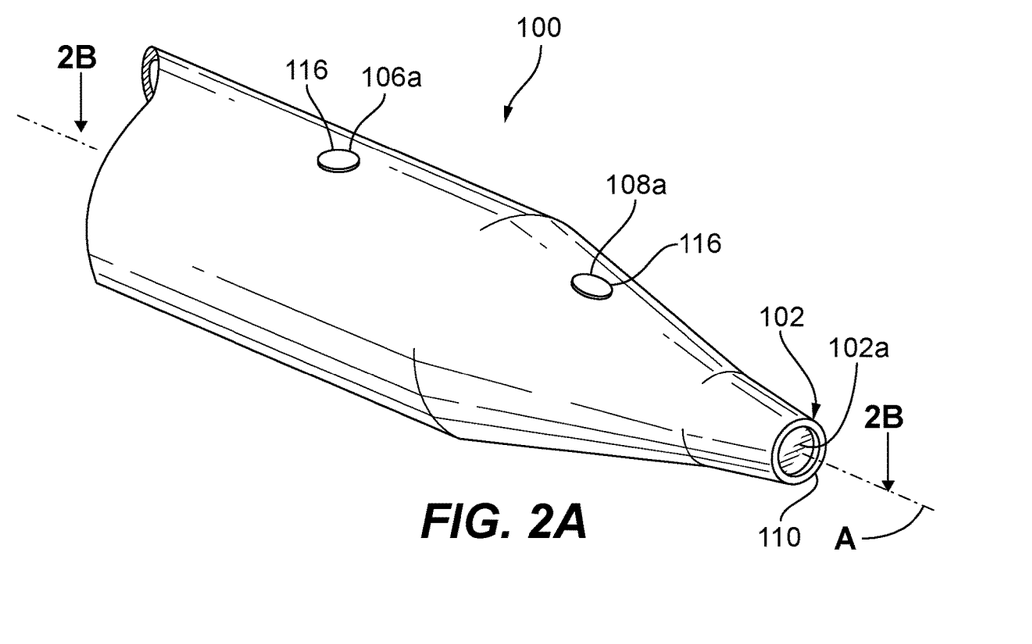
FIG. 2A is a perspective view of the air data probe of FIG. 1, showing a stage of repair associated with machining away the damaged area around the Pitot pressure port to generate a uniform deposition surface in accordance with embodiments of the present disclosure.

As shown in FIG. 2A, port inlet 102 can also be plugged with a plug 102a. If needed, plug 102a can include an enlarged head similar to plugs 106a and 108, and/or can be welded or otherwise secured in place. Those skilled in the art will readily appreciate that the additive techniques described below allow for repair of the air data probe 100 while it is still mounted to an aircraft. For on-aircraft repair, probe 100 would be scanned or analyzed via metrology and material would be deposited (similar to the method on-ground). For machining the deposited material, a special tooling suitable for on-aircraft use can be used to reshape the probe features.

Figure 2B:
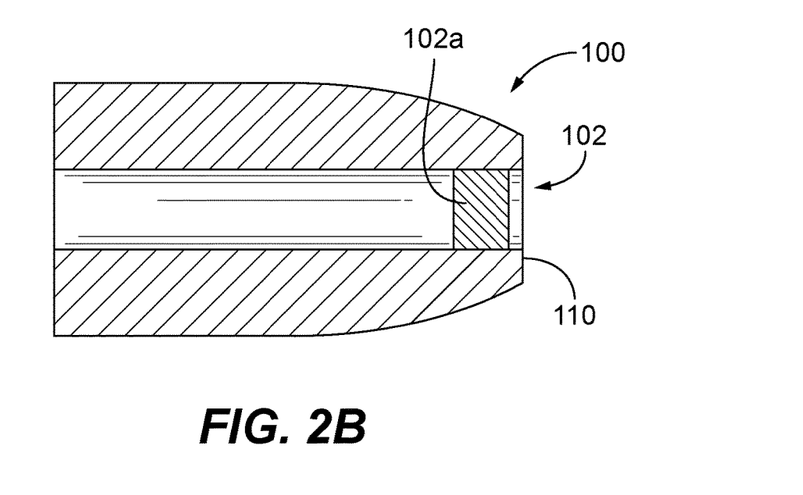
FIG. 2B is a schematic side cross-sectional view of the air data probe of FIG. 1, showing a stage of repair associated with machining away the damaged area around the Pitot pressure port to generate a uniform deposition surface in accordance with embodiments of the present disclosure.

As shown in FIGS. 2A and 2B, once plugged, repairing air data probe 100 includes machining damaged area/portion 104 of air data probe 100 to generate a deposition surface 110. In FIGS. 2A and 2B, damaged portion 104 has been machined away to form a uniform deposition surface 110. In accordance with some embodiments, machining damaged portion 104 of air data probe 100 includes removing corrosion from damaged area 104.

Figure 3:
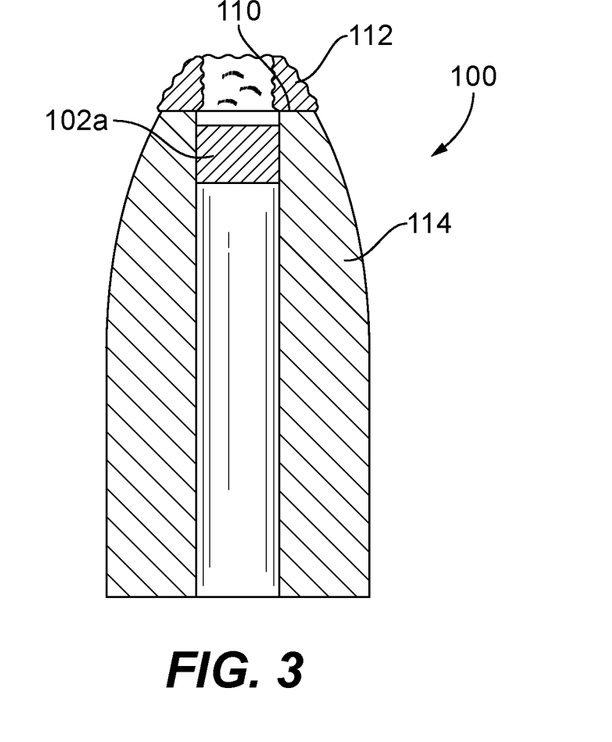
FIG. 3 is a schematic side cross-sectional view of the air data probe of FIG. 1, showing a stage of repair associated with depositing a material on the deposition surface of the air data probe to repair the damaged portion of the air data probe in accordance with embodiments of the present disclosure.
Figure 4:
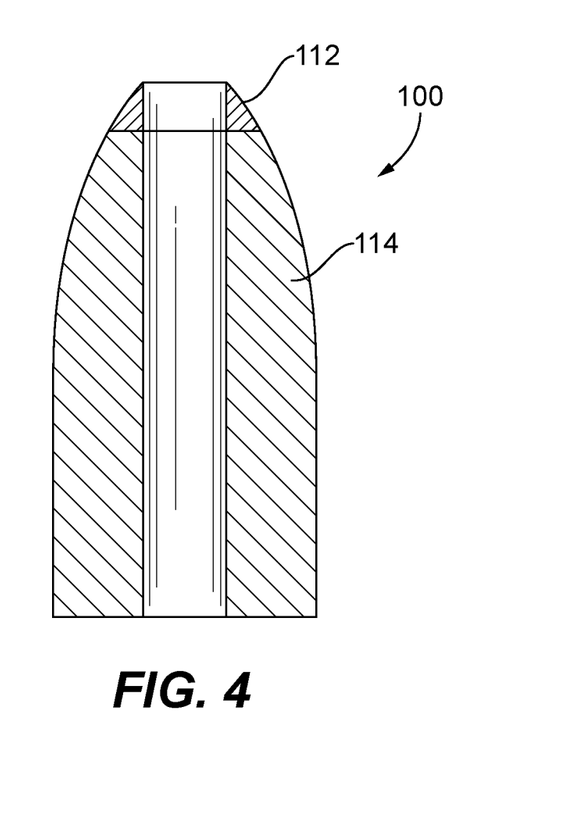
FIG. 4 is a schematic side cross-sectional view of the air data probe of FIG. 1, showing the repaired air data probe of FIG. 1 where the deposited material has been machined to conform to a specified geometry in accordance with embodiments of the present disclosure.

As shown in FIG. 3, to repair air data probe 100, material 112 is deposited on uniform deposition surface 110 of air data probe 100 to repair damaged portion 104 of air data probe 100. Depositing material 112 on deposition surface 110 includes depositing material 112 using at least one of directed energy deposition or powder bed fusion. FIG. 3 shows air data probe 100 with deposited material 112. In this embodiment, deposited material 112 includes an alloy having higher wear resistance and/or a higher corrosion resistance than an original material 114 of air data probe 100, or the same as original material 114. It is also contemplated that, in some embodiments, deposited material 112 includes an alloy having better thermal performance than original material 114 of air data probe 100, or the same material as original material 114. For example, original material 114 could be nickel 200, 201 and/or 211, while deposited new material 112 could be a nickel super alloy, like INCONEL® 625 alloy, available from Specialty Metals Corporation of New Hartford, N.Y., cobalt chrome, titanium, or the like. In accordance with some embodiments, deposited material 112 can be the same as original material 114 with respect to all properties, e.g. deposited material 112 is the same as original material 114. With reference now to FIG. 4, the method includes machining deposited material 112 to conform to a specified geometry. FIG. 4 shows probe 100 with machining completed. As such, plug 102a has been removed. It is also contemplated that plugs 106a and 108a can also be removed after machining.

Figure 5:
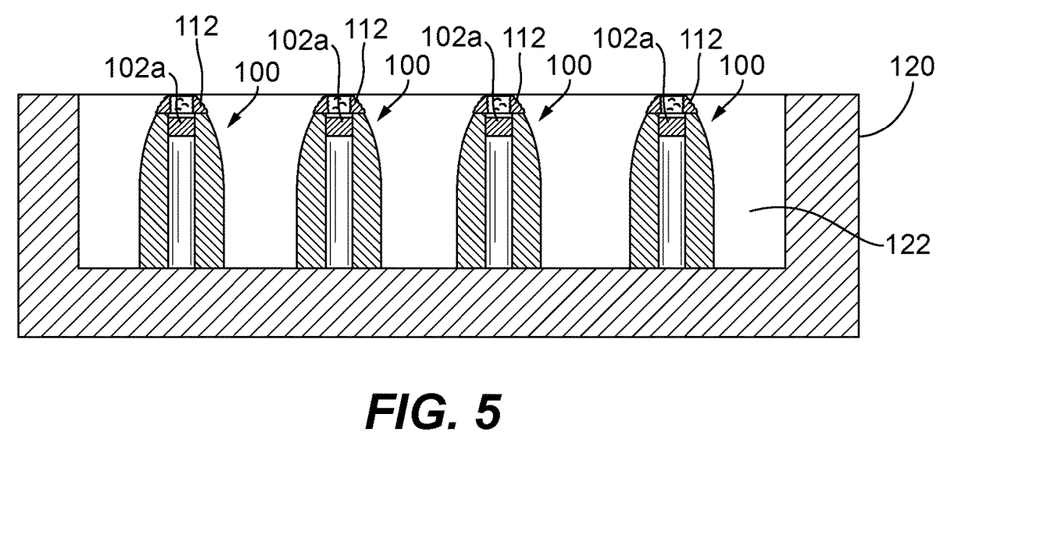
FIG. 5 is a schematic side cross-sectional view of exemplary embodiments of air data probes, showing a stage of repair associated with depositing a material on the deposition surface of the air data probe by powder bed deposition in accordance with embodiments of the present disclosure.

With reference now to FIG. 5, powder bed 120 is used as a method for depositing material 112 through a powder bed fusion process. Those skilled in the art will readily appreciate that the powder bed fusion process can include direct metal laser sintering (DMLS), Electron beam melting (EBM), Selective heat sintering (SHS), Selective laser melting (SLM) and Selective laser sintering (SLS). Powder bed 120 includes powder material 122 that is consolidated by fusion onto deposition surface 110 proximate to damaged area 104 of air data probe 100 to form deposited material 112. Plugs 102a, 106a and 108a (not shown) assist in preventing and/or limiting powder material 122 from entering into ports 102, 106, 108 of air data probe 100 during the fusion process. A similar powder bed 120 fusion process can readily be applied to repairing damaged port inlets 108 and/or 106. Those skilled in the art will readily appreciate that more than one probe can be repaired at once using powder bed 120. Additionally, it is contemplated that the powder bed fusion process would be performed with probe 100 removed from the aircraft.

Figure 6:
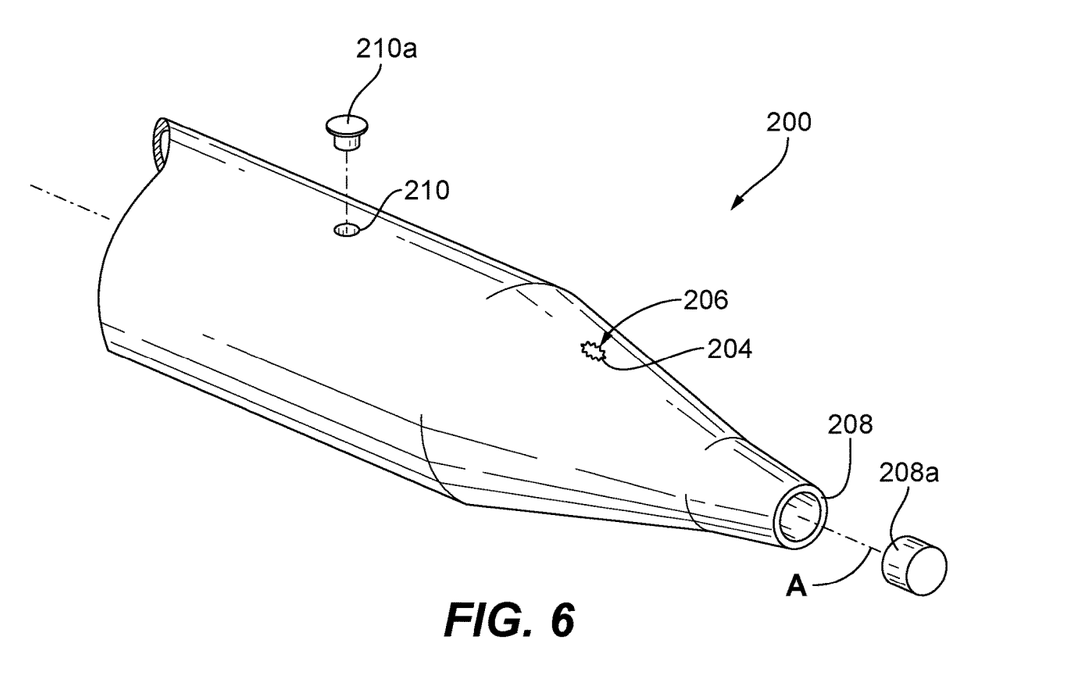
FIG. 6 is a schematic perspective view of a portion of another exemplary embodiment of an air data probe constructed in accordance with the embodiments of the present disclosure, showing a damaged area around the angle of attack port.

As shown in FIGS. 6-11, embodiments of the present invention also provide for methods to repair a damaged portion of another sense port inlet, e.g. an angle of attack port and/or a static pressure port, an angle of sideslip port, or a drain port, that opens in a direction transverse to a longitudinal axis A of an air data probe 200. With reference now to FIG. 6, air data probe 200 is shown with a damaged area 204 around a sense port inlet 206, e.g. an angle of attack port inlet 206. The method includes plugging sense port inlets 208 and 210 (damaged or not) with respective plugs 208a and 210a to limit contamination from entering air data probe 200 during repair.

Figure 7:
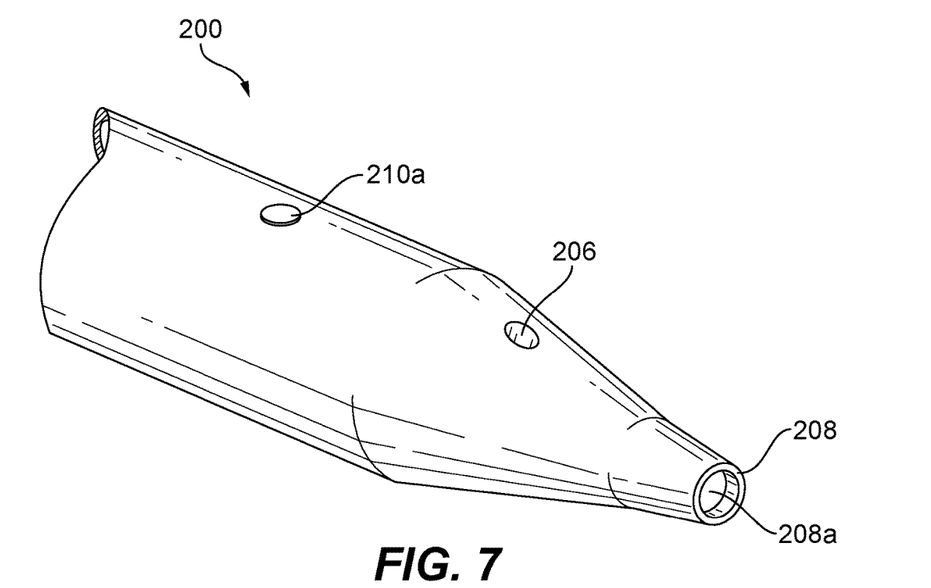
FIG. 7 is a schematic perspective view of a portion of the air data probe of FIG. 6, showing a repair stage after machining away the damaged area around the angle of attack port by enlarging the angle of attack port in accordance with embodiments of the present disclosure.

With reference now to FIG. 7, the repair method includes machining away the damaged and/or corroded area 204 around sense port inlet 206 and enlarging sense port inlet 206. As shown in FIG. 7, sense port inlet 206 is oversized compared to its original size because the enlargement is complete as shown in FIG. 7. The enlargement can be performed by drilling, milling, or any other suitable machining or material removal process, and the enlarged port inlet 206 can optionally be chamfered to help with joint penetration later in the process, which is described below.

Figure 8:
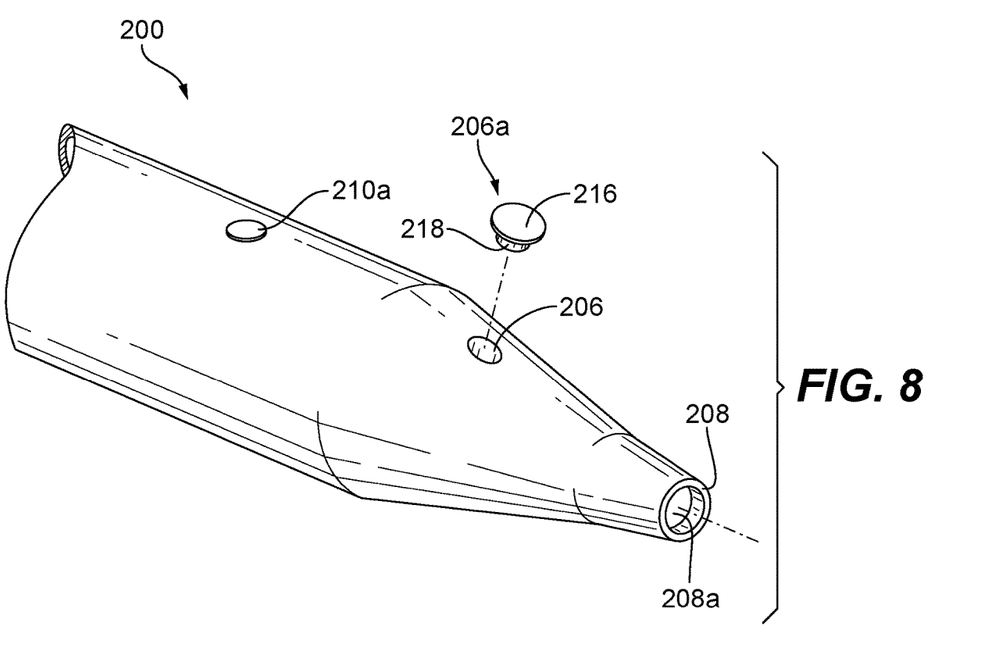
FIG. 8 is a schematic perspective view of a portion of the air data probe of FIG. 6, showing a repair stage associated with plugging the angle of attack port in accordance with embodiments of the present disclosure.

The method includes inserting a plug 206a into the now enlarged sense port inlet 206. In accordance with some embodiments, plug 206a can be secured to enlarged sense port inlet 206 by welding, brazing, or simply with a tight fit. Plug 206a includes an enlarged head 216 and an insert portion 218. When insert portion 218 is inserted in enlarged sense port 206, enlarged head 216 prevents over insertion of plug 206a. In the embodiment of FIG. 8, plug 206a is not a temporary plug, but instead provides a deposition surface for adding material during the additive process. Plug 206a can be of the same material as air data probe 200, for example to allow autogenous welding as described below, or of any other suitable material. For example, if the probe body of air data probe 200 is of NI200 ASTM B160, plug 206a can be made of the same material. In accordance with some embodiments, plug 206a and/or deposited material 212, described below, includes an alloy having a higher wear resistance and/or a higher corrosion resistance than other portions of the probe body of air data probe 200.

Figure 9:
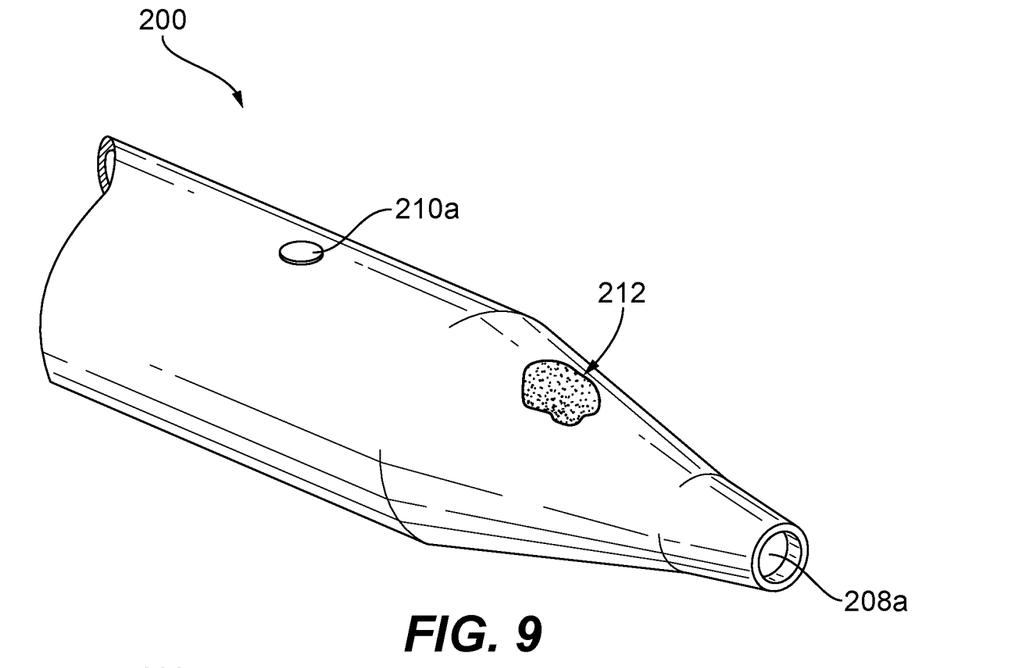
FIG. 9 is a schematic perspective view of a portion of the air data probe of FIG. 6, showing a repair stage after depositing the material on the air data probe over and around the plug in accordance with embodiments of the present disclosure.
Figure 10:
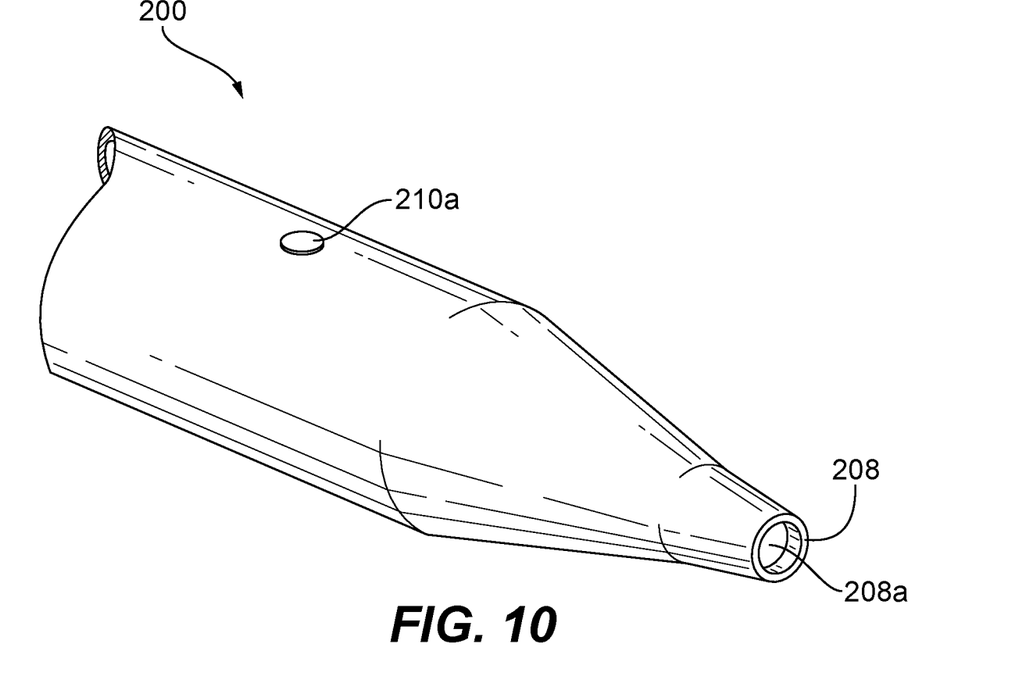
FIG. 10 is a perspective view of the air data probe of FIG. 6, showing a repair stage after the deposited material has been machined to conform to a specified geometry in accordance with embodiments of the present disclosure.

With reference now to FIG. 9, the method includes depositing a material 212 over and around plug 206a. Depositing material 212 includes depositing material 212 using at least one of directed energy deposition or powder bed fusion, similar to the powder bed fusion processes described above and as shown in FIG. 5. After depositing material 212 over and around plug 206a, the method includes machining deposited material 212 to conform to a specified geometry. Once machined to that specified geometry, e.g. to be flush with the existing probe surface, as shown in FIG. 10, a new sense port 220 is formed in substantially the same position as plug 206a, as shown in FIG. 11.

Figure 11:
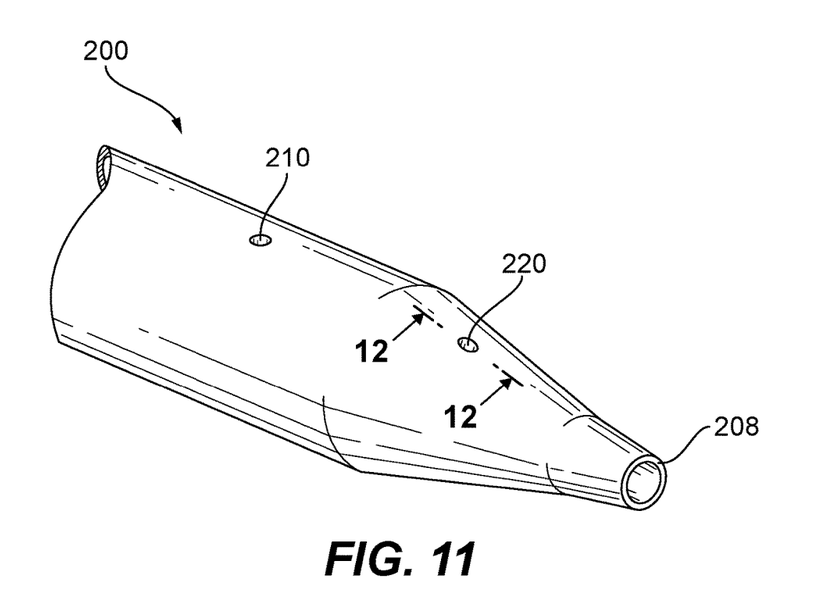
FIG. 11 is a perspective view of the air data probe of FIG. 6, showing a new port positioned in substantially the same position as the original damaged or corroded angle of attack port.

With reference to FIG. 11, new sense port 220 is formed in air data probe 200 in substantially the same position where original sense port 206 was located. For example, new sense port 220 can be formed through center of plug 206a, or near the center. The position for forming sense port 220 can be determined based on at least one other port location in air data probe 200, e.g., using static port 210. New sense port 220 can be formed by drilling, milling, or any other suitable process. After new sense port 220 is formed, air data probe 200 can be degreased, flushed, and/or tested for suitability to return to service as needed.

Figure 12:
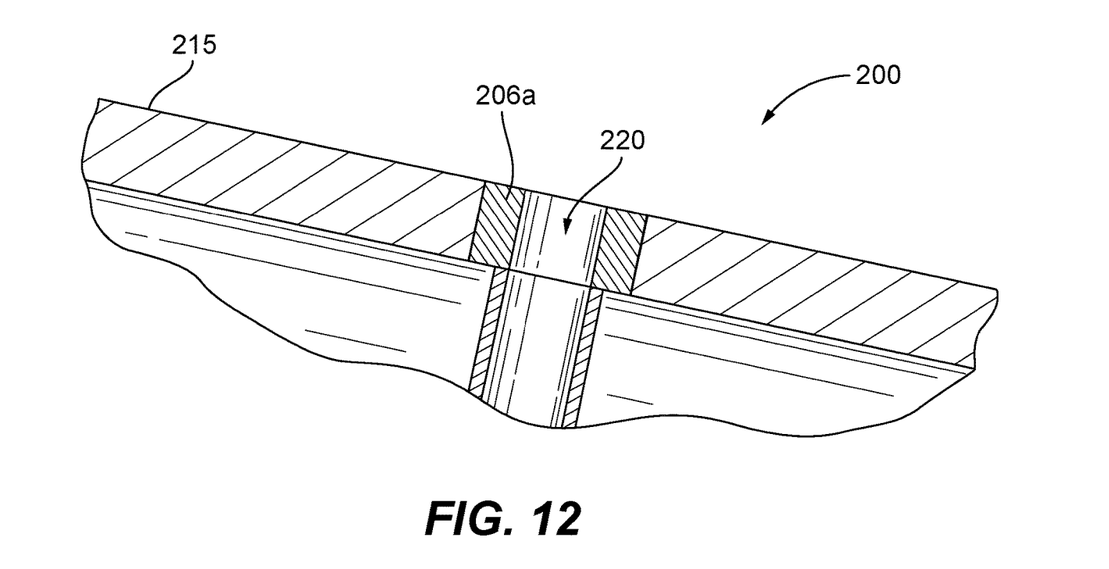
FIG. 12 is a cross-sectional side elevation view of a portion of the air data probe of FIG. 6, showing the new sense port formed through deposited material and the plug.

With reference to FIG. 12, air data probe 200 includes a static port 208 and a newly formed angle of attack sense port 220. At least a portion of the wall surrounding the newly formed angle of attack sense port 220 is defined by deposited material 212 and/or plug 206a which can have a different microstructure than a material that defined wall 215 of air data probe 200 prior to repair. In accordance with some embodiments, the microstructure of deposited material 212 can have better structural qualities (such as those described below with respect to wear and/or corrosion resistance) than material 215, or they can be the same. In accordance with some embodiments, deposited material 212 includes an alloy having at least one of a higher wear resistance or a higher corrosion resistance than material 215, or deposited material 212 can be the same as material 215.

While shown and described above in the exemplary context of repairing a Pitot pressure port and an angle of attack sense port, those skilled in the art will readily appreciate that any other suitable type of port can be repaired in accordance with the invention. For example, the sense port repaired can be a type selected from the group consisting of an angle of attack port, a static port, an angle of sideslip port, and a drain port. Moreover, direct material deposition can be used to repair other corroded or damaged areas separate from the various sense ports, such as a side wall of the air data probe.

The methods and systems of the present invention, as described above and shown in the drawings, provide for air data probe repair with superior properties including repair of sense ports that are corroded or otherwise damaged. The ability to repair air data probes reduces overall costs, as instead of replacing an air data probe, the air data probe can be repaired. While the apparatus and methods of the subject invention have been shown and described with reference to illustrative embodiments, those skilled in the art will readily appreciate that changes and/or modifications may be made thereto without departing from the spirit and scope of the subject invention.

What is claimed is:

1. A method of repairing an air data probe comprising:
   assessing an air data probe for a damaged portion;
   depositing a material on the air data probe to repair the damaged portion of the air data probe; and
   scanning the air data probe with an optical inspection device to assess an amount and a location of damage.

2. A method as recited in claim 1, further comprising machining the damaged portion of an air data probe to generate a machined portion.

3. A method as recited in claim 1, wherein the air data probe includes at least one sense port inlet, and the method includes temporarily plugging the at least one sense port inlet to limit contamination from entering the air data probe during repair.

4. A method as recited in claim 1, wherein depositing the material includes depositing the material using at least one of directed energy deposition or powder bed fusion.

5. A method as recited in claim 1, further comprising machining the material to conform to a specified geometry.

6. A method as recited in claim 1, wherein the material includes an alloy having at least one of a higher wear resistance or a higher corrosion resistance than an original material of the air data probe.

7. A method as recited in claim 1, wherein the material includes an alloy having better thermal performance than an original material of the air data probe.

8. A method as recited in claim 1, wherein the air data probe is mounted to an aircraft during material deposition.

9. A method of repairing an air data probe comprising:
assessing an air data probe for a damaged portion; and
depositing a material on the air data probe to repair the damaged portion of the air data probe, wherein the damaged portion is a damaged sense port inlet.

10. A method as recited in claim 9, further comprising temporarily plugging the damaged sense port inlet to limit contamination from entering the air data probe during repair.

11. A method as recited in claim 9, wherein the damaged sense port inlet is defined through a tip of the air data probe.

12. A method as recited in claim 9, wherein the damaged sense port inlet is a Pitot pressure port inlet.

13. A method as recited in claim 9, wherein the damaged sense port inlet is at least one of an angle of attack port inlet, a static port inlet, an angle of sideslip port inlet, or a drain port inlet.

14. A method as recited in claim 9, further comprising inserting a plug into the damaged sense port inlet.

15. A method as recited in claim 13, wherein depositing the material includes depositing material over and around the plug.

16. A method as recited in claim 15, further comprising machining at least one of the deposited material or plug to conform to a specified geometry and forming a new sense port in substantially the same position as the plug.

17. An air data probe comprising:
a probe body including a sense port inlet defined through a wall of the probe body, wherein at least a portion of the wall surrounding the sense port inlet is defined by a deposited material having a different microstructure than a material defining another portion of the wall, wherein the sense port inlet is surrounded at least in part with a plug mounted in the wall of the probe body.

18. An air data probe as recited in claim 17, wherein the sense port inlet is a Pitot pressure port inlet defined on a tip of the probe body.

19. An air data probe as recited in claim 17, wherein the deposited material includes material deposited by at least one of directed energy deposition or powder bed fusion.

20. A method of repairing an air data probe comprising:
assessing an air data probe for a damaged portion, wherein the air data probe includes at least one sense port inlet;
depositing a material on the air data probe to repair the damaged portion of the air data probe; and
temporarily plugging the at least one sense port inlet to limit contamination from entering the air data probe during repair.

21. A method of repairing an air data probe comprising:
assessing an air data probe for a damaged portion; and
depositing a material on the air data probe to repair the damaged portion of the air data probe, wherein depositing the material includes depositing the material using at least one of directed energy deposition or powder bed fusion.

* * * * *